No. 11,899. Reissued Mar. 26, 1901.

F. J. NEWMAN & J. LEDWINKA.

MEANS FOR PROPULSION OF VEHICLES BY ELECTRICITY.

(Application filed Feb. 11, 1901.)

2 Sheets—Sheet 1.

WITNESSES:

C. L. Belcher

Birney Hines

INVENTORS

Fred. J. Newman

& Josef Ledwinka

BY

Wesley G. Carr

ATTORNEY.

No. 11,899. Reissued Mar. 26, 1901.

F. J. NEWMAN & J. LEDWINKA.

MEANS FOR PROPULSION OF VEHICLES BY ELECTRICITY.

(Application filed Feb. 11, 1901.).

2 Sheets—Sheet 2.

WITNESSES:

C. L. Belcher

Birney Hines

INVENTORS

Fred. J. Newman

& Josef Ledwinka

BY

Oakley G. Carr

ATTORNEY.

UNITED STATES PATENT OFFICE.

FREDERICK J. NEWMAN AND JOSEF LEDWINKA, OF CHICAGO, ILLINOIS, ASSIGNORS, BY MESNE ASSIGNMENTS, TO THE HUB MOTOR COMPANY, OF NEW JERSEY.

MEANS FOR PROPULSION OF VEHICLES BY ELECTRICITY.

SPECIFICATION forming part of Reissued Letters Patent No. 11,899, dated March 26, 1901.

Original No. 638,643, dated December 5, 1899. Application for reissue filed February 11, 1901. Serial No. 46,949.

*To all whom it may concern:*

Be it known that we, FREDERICK J. NEWMAN, a citizen of the United States, and JOSEF LEDWINKA, a subject of the Emperor of Austria-Hungary, both residing at the city of Chicago, county of Cook, and State of Illinois, have invented certain new and useful Improvements in Means for Propelling Vehicles by Electricity, of which the following is a specification.

Our invention relates to the propulsion of vehicles by the use of electricity as a motive power; and it has for its object to provide a means for applying such power to vehicles of the character heretofore in use without materially changing the appearance of such vehicles and without exposing the driving mechanism. In order to accomplish our purpose, we embody the driving-motors and their power-transmitting gearing in the wheel-hubs and supply electric energy to the motors from a suitable source, which may be located in any convenient part of the body of the vehicle.

Our invention principally consists in embodying the driving electric motors and the power-transmitting gearing in the hubs of the vehicle-supporting wheels.

Our invention is illustrated in the accompanying drawings, in which—

Figures 1, 2:
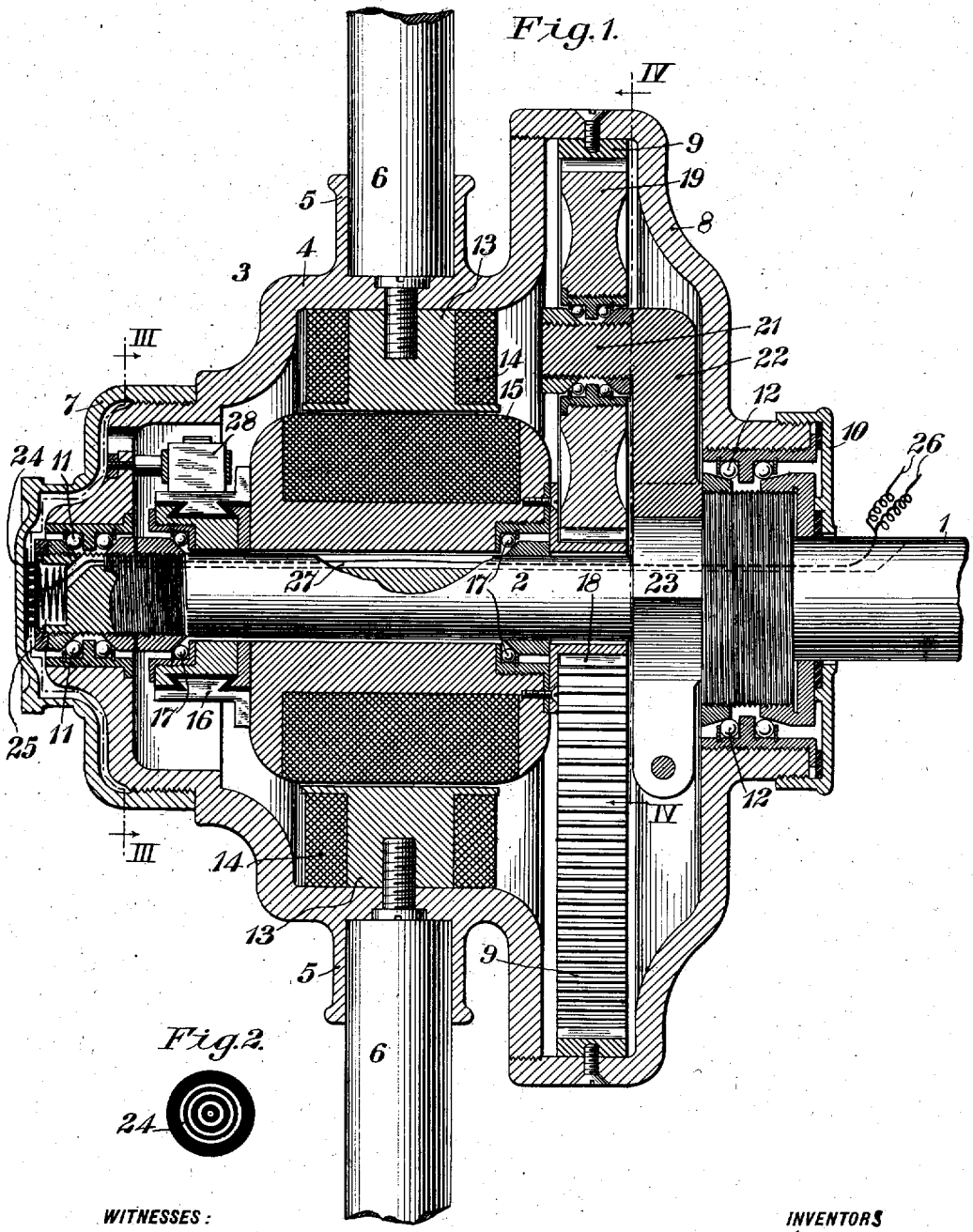
Figure 3:
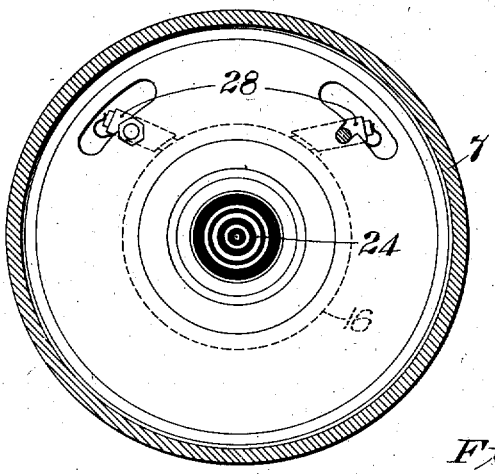
Figure 5:
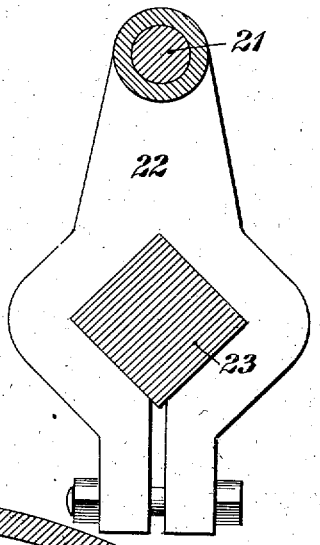
Figure 4:
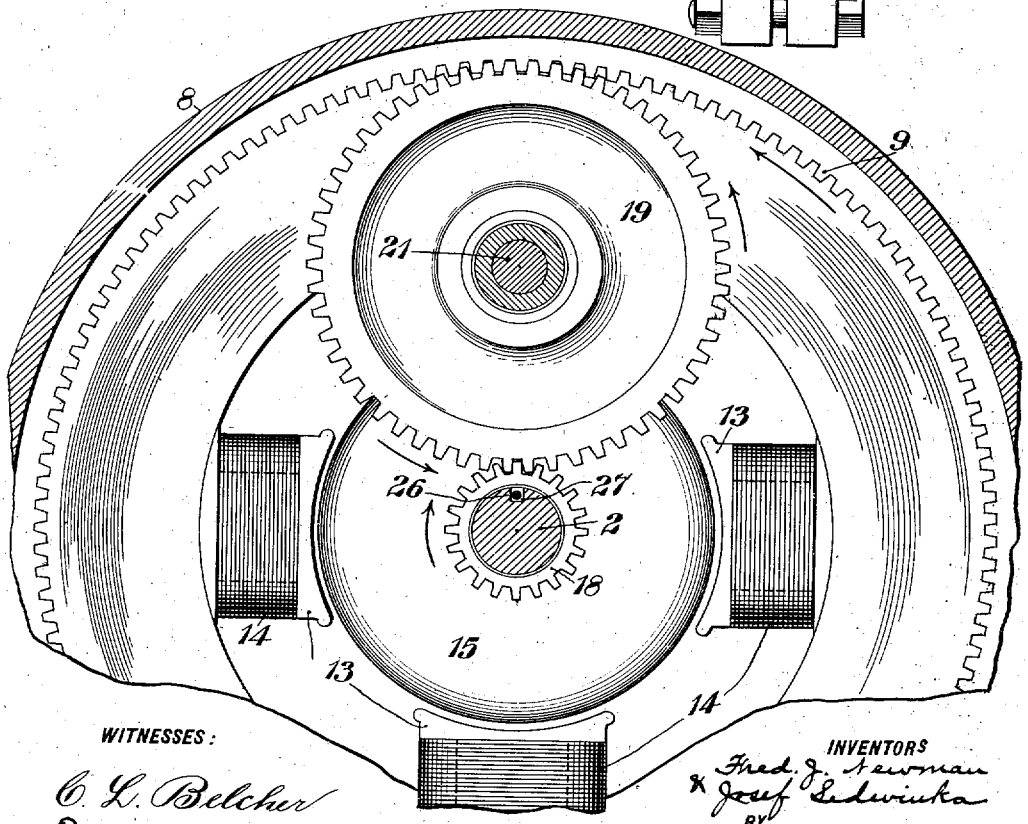

Figure 1 is a central longitudinal section through the hub of a wheel mounted upon a non-rotatable shaft and having our invention embodied therein. Fig. 2 is a detail view of contact-rings through which current is supplied to the electric motor that is embodied in the hub. Fig. 3 is a view, partially in end elevation and partially in section, taken on line III III of Fig. 1. Fig. 4 is a sectional view taken on line IV IV of Fig. 1. Fig. 5 is a detail view of a bracket for supporting one of the members of the power-transmitting gearing.

In the drawings we have shown a portion of only one vehicle-axle and of one wheel mounted thereon, it being of course understood that the usual number of axles and wheels may be employed and that the vehicle-body may be of any desired character. It will also be understood that all of the supporting-wheels may be driving-wheels or that less than the whole number of wheels may be provided with power mechanism, as may be found convenient or desirable.

In the drawings, 1 is a non-rotatable vehicle-axle, the outer cylindrical ends 2 of which receive the hubs 3 of suitable supporting-wheels, only one of said hubs being, however, shown in the drawings. The hub-shell, as shown, comprises four parts, the middle part 4 of which has sockets 5, which receive the inner ends of the wheel-spokes 6 and also constitute the field-magnet frame or ring of the driving electric motor. The outer end portion or cap 7 has a screw-threaded engagement with the outer end of portion 4, and the part 8 has a like engagement with the inner end of the part 4. The portion 8 is provided with an internal annular gear or rack 9 adjacent to the part 4, and its inner end is closed by a screw-cap 10.

The hub-shell is provided with ball-bearings 11 and 12 at its respective ends, the ball-bearings 11 being located within the cap 7 and the bearings 12 within the inner end of the portion 8, adjacent to the cap 10. The portion 4 of the shell is provided with field-magnet pole-pieces 13, which are surrounded by the field-magnet coils 14. The motor-armature 15 and the commutator-cylinder 16 are provided with ball-bearings 17 at the respective ends of the combined structure and with a pinion 18, which meshes with a gear-wheel 19. The gear-wheel 19 also meshes with the internal gear or rack 9 and is journaled by means of ball-bearings upon a stub-shaft 21, projecting laterally from a bracket 22, which is clamped upon a squared portion 23 of the axle 1.

It will be seen that the field-magnet and the armature are both rotatable and that the gearing is such that they rotate in opposite directions. In order to supply electric energy to the motor, we provide the cap 7 with four contact-rings 24, with which engage corresponding brushes, which are pressed against the rings by a spring 25, located in a recess in the end of the axle. The conductors 26 for supplying electrical energy to the brushes extend through a recess or groove 27 in the axle. The commutator-brushes 28 are supported by the hub-shell, as shown, and therefore rotate with it.

The speed at which the vehicle is driven may obviously be varied by varying the structure of the motor, the ratio of the members of the gearing, or the energy supplied to the motor, or as many of these elements as it may be found desirable to vary.

We claim as our invention—

1. The combination with a non-rotatable vehicle-axle, of a supporting-wheel the hub-shell of which constitutes an electric-motor field-magnet frame or ring and an armature and power-transmitting gearing within the hub-shell, said hub-shell and armature being journaled to rotate in opposite directions around said axle.

2. A wheel for an electrically-propelled vehicle having a hub that serves as an electric-motor field-magnet, in combination with an armature and power-transmitting gearing inclosed within the hub.

3. A wheel for an electrically-propelled vehicle provided with a hub that embodies an electric motor and the shell of which is in part the field-magnet frame or ring, and, as a whole, completely incloses the other parts of the motor.

4. A vehicle-wheel having a hub that embodies an electric motor and gearing between the armature and the field-magnet thereof, a portion of the hub-shell constituting the field-magnet frame or ring and all the other parts being inclosed in said shell.

5. A vehicle-wheel hub comprising a shell the spoke-supporting part of which constitutes an electric-motor field-magnet frame or ring, in combination with field-magnet pole-pieces and coils, a combined armature and commutator-drum and gearing between the same and the hub-shell, all of said parts being inclosed in said shell.

6. A vehicle-wheel hub embodying an electric motor, the field-magnet frame of which is the spoke-supporting part of the hub-shell and the other parts of which are all inclosed in the hub-shell.

7. In a vehicle-wheel hub, and electric motor and gearing between the motor-armature and the hub-shell, the motor-coils, commutator, gearing and bearings being all completely inclosed within the hub-shell.

8. The combination with a non-rotatable vehicle-axle, of a wheel having its hub rotatably mounted on the axle and embodying an electric-motor field-magnet, an armature independently mounted on the axle and power-transmitting gearing, all inclosed within the hub-shell.

9. In an electrically-propelled vehicle, the combination with a non-rotatable axle, of a wheel having a hollow hub provided with coils and with an annular, internal gear and journaled on said axle, an armature provided with a pinion and also journaled on said axle, a bracket secured to the axle and a gear-wheel supported on the bracket and meshing with said internal gear and said pinion.

10. In an electrically-propelled vehicle, the combination with a non-rotatable axle, of a wheel having a hollow hub provided with field-magnet coils and with an annular, internal gear journaled on said axle, an armature provided with a pinion and also journaled on said axle, a bracket secured to the axle and a gear-wheel supported on the bracket and meshing with the internal gear and the pinion, said hub completely inclosing all of said other parts.

11. A vehicle-wheel hub embodying an electric motor for rotating the same, the field-magnet coils, the armature, the commutator, and the bearings being all completely inclosed within the hub-shell.

In testimony whereof we have hereunto subscribed our names this 1st day of February, 1901.

FREDERICK J. NEWMAN.
JOSEF LEDWINKA.

Witnesses:
C. L. BELCHER,
BIRNEY HINES.